(12) United States Patent
Mori et al.

(10) Patent No.: US 7,938,609 B2
(45) Date of Patent: May 10, 2011

(54) TIGHTENING STRUCTURE USING HIGH-STRENGTH SELF-FORMING SCREWS

(75) Inventors: Shigeto Mori, Hadano (JP); Akihide Umada, Hadano (JP); Mayumi Matsuno, Hadano (JP)

(73) Assignee: Kabushiki Kaisha Topura, Hadano-Shi, Kanagawa-Ken (JP)

( * ) Notice: Subject to any disclaimer, the term of this patent is extended or adjusted under 35 U.S.C. 154(b) by 239 days.

(21) Appl. No.: 12/315,460

(22) Filed: Dec. 3, 2008

(65) Prior Publication Data
US 2010/0008716 A1 Jan. 14, 2010

(30) Foreign Application Priority Data

Jul. 14, 2008 (JP) ................................. 2008-182482

(51) Int. Cl.
*F16B 25/00* (2006.01)
(52) U.S. Cl. ........................................ 411/386; 411/411
(58) Field of Classification Search .................. 411/426, 411/366.1, 386, 411, 387.4, 937.1; 470/198, 470/203; 408/219
See application file for complete search history.

(56) References Cited

U.S. PATENT DOCUMENTS

| 1,064,546 | A | * | 6/1913 | Ryan .............................. 411/308 |
| 2,263,424 | A | * | 11/1941 | Langer .......................... 411/411 |
| 2,380,944 | A | * | 8/1945 | Cole ............................. 411/308 |
| 3,245,096 | A | * | 4/1966 | McKay et al. .................. 470/14 |
| 3,351,115 | A | * | 11/1967 | Boehlow ....................... 411/168 |
| 3,537,288 | A | * | 11/1970 | Ansingh ........................... 72/88 |
| 3,601,830 | A | * | 8/1971 | Stover ............................. 470/11 |
| 3,939,512 | A | * | 2/1976 | Thurston et al. ................ 470/10 |
| 5,188,496 | A | * | 2/1993 | Giannuzzi ..................... 411/386 |
| 5,795,120 | A |   | 8/1998 | Hurdle |
| 6,030,162 | A | * | 2/2000 | Huebner ....................... 411/413 |
| 6,074,149 | A | * | 6/2000 | Habermehl et al. .......... 411/442 |
| 7,255,523 | B2 | * | 8/2007 | Laan ............................. 411/411 |
| 2009/0053008 | A1 | * | 2/2009 | Yamaki ........................ 411/386 |

FOREIGN PATENT DOCUMENTS

EP           1 054 170          11/2000

* cited by examiner

*Primary Examiner* — Gary Estremsky
(74) *Attorney, Agent, or Firm* — Day Pitney LLP

(57) ABSTRACT

The present invention provides a tightening structure with which a reduction in processing steps is achieved without modifying the shape of a partner member an improvements in bolt strength and fatigue strength are achieved, and with which the fitting length of a thread ridge is not altered greatly in comparison with a conventional tightening structure such that a size reduction can be achieved, thereby contributing greatly to a reduction in the weight of a vehicle.

8 Claims, 7 Drawing Sheets

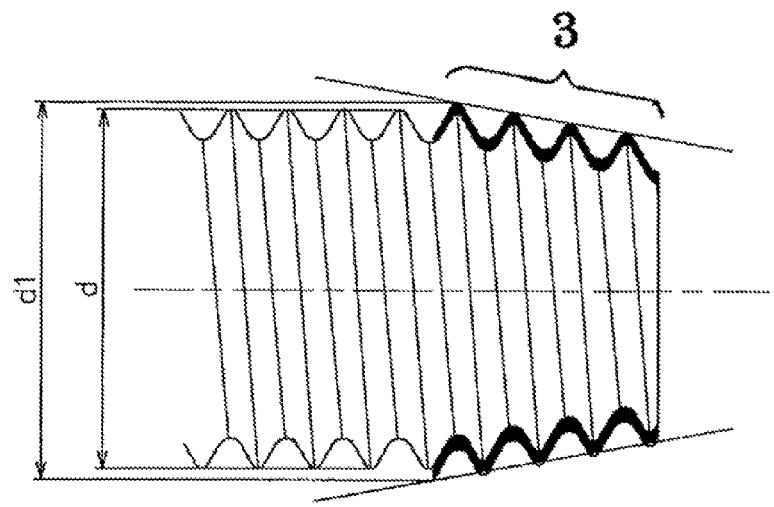
FIG.1
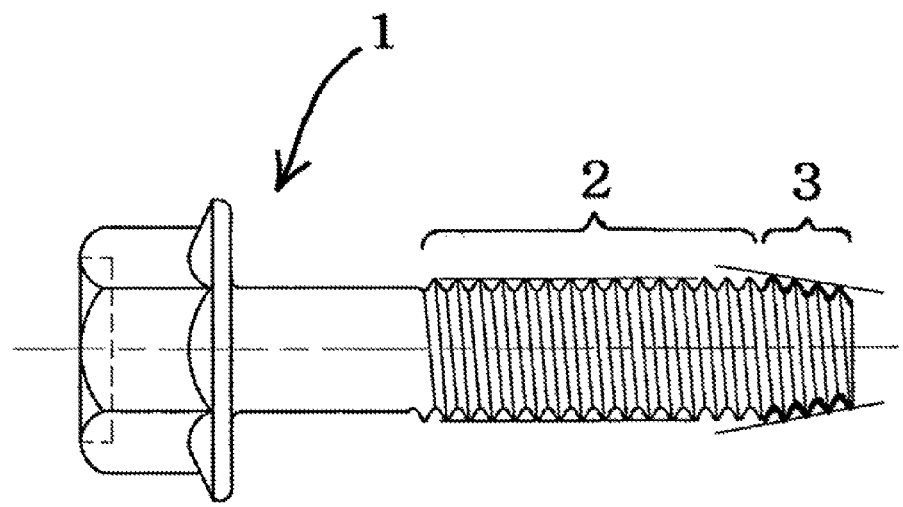

FIG. 4

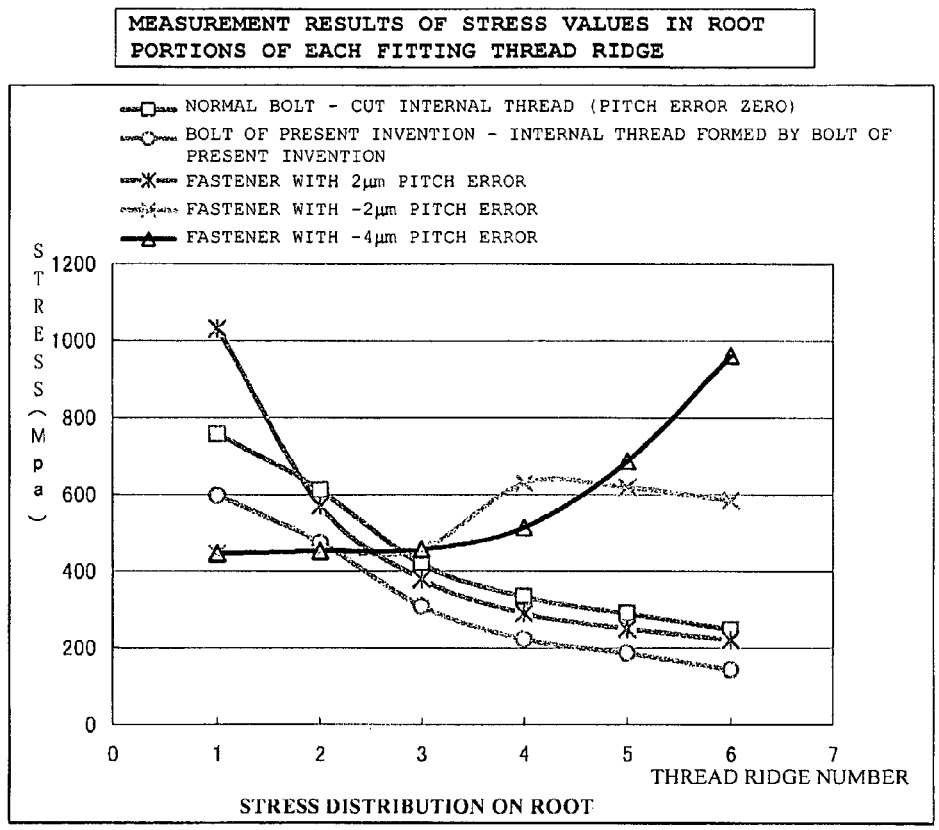

SUMMARY OF MEASUREMENT RESULTS OF STRESS VALUES IN ROOT PORTIONS OF EACH FITTING THREAD RIDGE

| Sample Conditions | First Thread | Second Thread | Third Thread | Fourth Thread | Fifth Thread | Sixth Thread | Maximum Value | Average Value |
|---|---|---|---|---|---|---|---|---|
| NORMAL BOLT - CUT INTERNAL THREAD (PITCH ERROR ZERO) | 756 | 611 | 419 | 333 | 290 | 247 | 756 | 443 |
| BOLT OF PRESENT INVENTION - INTERNAL THREAD FORMED BY BOLT OF PRESENT INVENTION | 597 | 474 | 308 | 222 | 186 | 143 | 597 | 322 |
| FASTENER WITH 2μM PITCH ERROR | 1031 | 570 | 380 | 290 | 250 | 220 | 1031 | 457 |
| FASTENER WITH -2μM PITCH ERROR | 447 | 453 | 458 | 630 | 618 | 584 | 630 | 532 |
| FASTENER WITH -4μM PITCH ERROR | 447 | 453 | 458 | 515 | 687 | 962 | 962 | 587 |

FIG.5

| OUTER DIAMETER = REGION BELOW PRESENT INVENTION | | | | | | | | | | | | | | | | | | |
|---|---|---|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × 0%) | | | | | | | | | | | | | | | | | |
| PERCENTAGE OF THREAD ENGAGEMENT | 60~75% | | | | | | 75%~90% | | | | | | 90~100% | | | | | |
| FITTING LENGTH | <1.5d | | 1.5d~2.5d | | >2.5d | | <1.5d | | 1.5d~2.5d | | >2.5d | | <1.5d | | 1.5d~2.5d | | >2.5d | |
| FRICTION STABILIZER COATING | YES | NO | YES | NO | YES | NO | YES | NO | YES | NO | YES | NO | YES | NO | YES | NO | YES | NO |
| a) DRIVING TORQUE | × | × | × | × | × | × | × | × | × | × | × | × | × | × | × | × | × | × |
| b) COEFFICIENT OF FRICTION | × | × | × | × | × | × | △ | × | △ | × | △ | × | △ | × | △ | × | △ | × |
| c) VARIATION IN GENERATED AXIAL TENSION | × | × | × | × | × | × | △ | × | △ | × | △ | × | △ | × | △ | × | × | × |
| d) INTERNAL THREAD STRENGTH(1400 MPa) | × | | × | | △ | | × | | △ | | △ | | × | | △ | | ◎ | |
| e) FATIGUE STRENGTH (MPa) | × | | × | | △ | | × | | △ | | △ | | × | | △ | | ◎ | |
| OVERALL EVALUATION | × | × | × | × | × | × | × | × | × | × | × | × | × | × | × | × | △ | × |

| OUTER DIAMETER = REGION AT PRESENT INVENTION | | | | | | | | | | | | | | | | | | |
|---|---|---|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × 1~10%) | | | | | | | | | | | | | | | | | |
| PERCENTAGE OF THREAD ENGAGEMENT | 60~75% | | | | | | 75%~90% | | | | | | 90~100% | | | | | |
| FITTING LENGTH | <1.5d | | 1.5d~2.5d | | >2.5d | | <1.5d | | 1.5d~2.5d | | >2.5d | | <1.5d | | 1.5d~2.5d | | >2.5d | |
| FRICTION STABILIZER COATING | YES | NO | YES | NO | YES | NO | YES | NO | YES | NO | YES | NO | YES | NO | YES | NO | YES | NO |
| DRIVING TORQUE | ◎ | ○ | ◎ | ○ | ◎ | ◎ | ◎ | ○ | ◎ | ○ | ◎ | ◎ | ◎ | ○ | ○ | ○ | ◎ | ◎ |
| COEFFICIENT OF FRICTION | ○ | △ | ○ | △ | ◎ | △ | ◎ | ○ | ◎ | ○ | ◎ | ◎ | ◎ | ○ | ○ | △ | ◎ | △ |
| VARIATION IN GENERATED AXIAL TENSION | ○ | △ | ○ | △ | ◎ | △ | ◎ | ○ | ◎ | ○ | ◎ | ◎ | ◎ | ○ | ○ | △ | ◎ | △ |
| INTERNAL THREAD STRENGTH(1400 MPa) | × | | ○ | | ◎ | | ○ | | ◎ | | ◎ | | △ | | ◎ | | ◎ | |
| FATIGUE STRENGTH (MPa) | × | | ○ | | ◎ | | ○ | | ◎ | | ◎ | | △ | | ◎ | | ◎ | |
| OVERALL EVALUATION | △ | △ | ○ | △ | ◎ | △ | ○ | ○ | ◎ | ○ | ◎ | ◎ | ○ | △ | ○ | △ | ◎ | △ |

| OUTER DIAMETER = REGION ABOVE PRESENT INVENTION | | | | | | | | | | | | | | | | | | |
|---|---|---|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × ABOVE 11%) | | | | | | | | | | | | | | | | | |
| PERCENTAGE OF THREAD ENGAGEMENT | 60~75% | | | | | | 75%~90% | | | | | | 90~100% | | | | | |
| FITTING LENGTH | <1.5d | | 1.5d~2.5d | | >2.5d | | <1.5d | | 1.5d~2.5d | | >2.5d | | <1.5d | | 1.5d~2.5d | | >2.5d | |
| FRICTION STABILIZER COATING | YES | NO | YES | NO | YES | NO | YES | NO | YES | NO | YES | NO | YES | NO | YES | NO | YES | NO |
| DRIVING TORQUE | ◎ | ◎ | ◎ | ○ | ◎ | ◎ | ◎ | ○ | ◎ | ○ | ◎ | ◎ | ○ | ○ | ○ | ○ | ◎ | △ |
| COEFFICIENT OF FRICTION | ○ | △ | ○ | △ | ◎ | △ | ○ | △ | ○ | △ | ◎ | △ | ○ | △ | ○ | △ | ◎ | △ |
| VARIATION IN GENERATED AXIAL TENSION | ○ | △ | ○ | △ | ◎ | △ | ○ | △ | ○ | △ | ◎ | △ | △ | × | △ | × | ◎ | × |
| INTERNAL THREAD STRENGTH(1400 MPa) | × | | × | | △ | | × | | △ | | ◎ | | △ | | ○ | | ◎ | |
| FATIGUE STRENGTH (MPa) | × | | × | | △ | | × | | △ | | ◎ | | △ | | ○ | | ◎ | |
| OVERALL EVALUATION | △ | △ | △ | △ | ◎ | △ | △ | △ | ○ | △ | ◎ | △ | △ | △ | ○ | △ | ◎ | △ |

| | |
|---|---|
| ◎ | SUPERIOR TO CURRENT COMPONENT |
| ○ | EQUAL OR SLIGHTLY SUPERIOR TO CURRENT COMPONENT |
| △ | SLIGHTLY INFERIOR TO CURRENT COMPONENT |
| × | INFERIOR TO CURRENT COMPONENT |

FIG.6

| OUTER DIAMETER = REGION BELOW PRESENT INVENTION | | | | | | | | | | | | | | | |
|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × 0%) | | | | | | | | | | | | | | |
| PERCENTAGE OF THREAD ENGAGEMENT | 60–75% | | | | | | 75–90% | | | | | 90–100% | | | |
| FITTING LENGTH | <1d | | 1d~2.2d | | >2.2d | | <1d | | 1d~2.2d | | >2.2d | <1d | | 1d~2.2d | >2.2d |
| FRICTION STABILIZER COATING | YES | NO | YES | NO | YES | NO | YES | NO | YES | NO | YES NO | YES | NO | YES NO | YES NO |
| a) DRIVING TORQUE | × | × | × | × | × | × | × | × | × | × | × × | × | × | × × | × × |
| b) COEFFICIENT OF FRICTION | × | × | × | × | | | △ | × | △ | × | | △ | × | △ × | |
| c) VARIATION IN GENERATED AXIAL TENSION | × | × | × | × | | | △ | × | △ | × | | △ | × | △ × | |
| d) INTERNAL THREAD STRENGTH(1400 MPa) | × | | × | | △ | | × | | △ | | ○ | × | | ○ | ○ |
| e) FATIGUE STRENGTH (MPa) | × | | × | | △ | | × | | △ | | ○ | × | | ○ | ○ |
| OVERALL EVALUATION | × | × | × | × | | | × | × | × | × | △ △ | × | × | △ △ | |

| OUTER DIAMETER = REGION AT PRESENT INVENTION | | | | | | | | | | | | | | | |
|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × 1~10%) | | | | | | | | | | | | | | |
| PERCENTAGE OF THREAD ENGAGEMENT | 60–75% | | | | | | 75–90% | | | | | 90–100% | | | |
| FITTING LENGTH | <1d | | 1d~2.2d | | >2.2d | | <1d | | 1d~2.2d | | >2.2d | <1d | | 1d~2.2d | >2.2d |
| FRICTION STABILIZER COATING | YES | NO | YES | NO | YES | NO | YES | NO | YES | NO | YES NO | YES | NO | YES NO | YES NO |
| DRIVING TORQUE | ◎ | △ | ◎ | △ | ◎ | | ◎ | △ | ◎ | △ | ◎ × | ◎ | △ | ○ △ | ◎ × |
| COEFFICIENT OF FRICTION | ○ | △ | ○ | △ | ◎ | △ | ◎ | ○ | ◎ | ○ | ◎ ○ | ◎ | ○ | ○ △ | ◎ △ |
| VARIATION IN GENERATED AXIAL TENSION | ○ | △ | ○ | △ | ◎ | | ◎ | ○ | ◎ | ○ | ◎ ◎ | ◎ | ○ | ○ △ | ◎ △ |
| INTERNAL THREAD STRENGTH(1400 MPa) | × | | ○ | | ◎ | | ○ | | ◎ | | ◎ | △ | | ◎ | ◎ |
| FATIGUE STRENGTH (MPa) | × | | ○ | | ◎ | | ○ | | ◎ | | ◎ | △ | | ◎ | ◎ |
| OVERALL EVALUATION | △ | × | ○ | △ | ○ | △ | ○ | ○ | ◎ | ○ | ◎ △ | ○ | △ | ○ △ | ◎ △ |

| OUTER DIAMETER = REGION ABOVE PRESENT INVENTION | | | | | | | | | | | | | | | |
|---|---|---|---|---|---|---|---|---|---|---|---|---|---|---|---|
| OUTER DIAMETER OF SELF-FORMING PORTION | PARALLEL SCREW OUTER DIAMETER + (PARALLEL SCREW OUTER DIAMETER × ABOVE 11%) | | | | | | | | | | | | | | |
| PERCENTAGE OF THREAD ENGAGEMENT | 60–75% | | | | | | 75–90% | | | | | 90–100% | | | |
| FITTING LENGTH | <1d | | 1d~2.2d | | >2.2d | | <1d | | 1d~2.2d | | >2.2d | <1d | | 1d~2.2d | >2.2d |
| FRICTION STABILIZER COATING | YES | NO | YES | NO | YES | NO | YES | NO | YES | NO | YES NO | YES | NO | YES NO | YES NO |
| DRIVING TORQUE | ◎ | ◎ | ◎ | ○ | △ | × | ◎ | ○ | ◎ | ○ | △ × | ○ | △ | ○ × | △ × |
| COEFFICIENT OF FRICTION | ○ | △ | ○ | △ | ○ | △ | ○ | △ | ○ | △ | ○ △ | ○ | △ | ○ △ | ○ △ |
| VARIATION IN GENERATED AXIAL TENSION | ○ | △ | ○ | △ | ○ | △ | ○ | △ | ○ | △ | ○ △ | △ | × | △ × | △ × |
| INTERNAL THREAD STRENGTH(1400 MPa) | × | | △ | | △ | | × | | ○ | | ○ | △ | | ○ | ◎ |
| FATIGUE STRENGTH (MPa) | × | | △ | | △ | | × | | ○ | | ○ | △ | | ○ | ◎ |
| OVERALL EVALUATION | △ | △ | △ | △ | △ | △ | △ | △ | ○ | △ | ○ △ | △ | △ | △ △ | △ △ |

| | |
|---|---|
| ◎ | SUPERIOR TO CURRENT COMPONENT |
| ○ | EQUAL OR SLIGHTLY SUPERIOR TO CURRENT COMPONENT |
| △ | SLIGHTLY INFERIOR TO CURRENT COMPONENT |
| × | INFERIOR TO CURRENT COMPONENT |

US 7,938,609 B2

TIGHTENING STRUCTURE USING HIGH-STRENGTH SELF-FORMING SCREWS

This application claims priority Japanese Patent Application No. JP2008-182482 filed on Jul. 14, 2008, which is incorporated here by reference.

BACKGROUND OF THE INVENTION

1. Field of the Invention

The present invention relates to a tightening structure for performing tightening using high-strength self-forming screws (bolts).

2. Description of the Related Art

In a conventional tightening structure for tightening a peripheral site of an engine using high-strength bolts, the high-strength bolt is screwed to an internal (female) screw of a nut or an internal screw tapped into a partner member. An internal thread portion of a nut or a tapped internal screw hole is of course formed by a cutting process. When an internal screw hole is formed by performing a tapping process on an aluminum die-cast member, a chassis or suspension member, a forged member, or the like in a peripheral site of an engine, for example, precision is required in the hole diameter, and therefore a large number of manufacturing steps, including casting (or prepared hole forming by forging), prepared hole drilling, prepared hole washing, tapping, and screw hole washing must be performed on the die-cast member or other partner member, as shown in FIG. 7.

Further, attempts have been made to increase the strength and reduce the size of the bolt in order to reduce vehicle weight and achieve tightening with a greater tightening force. This point is a well-known technical problem, as described in Japanese Unexamined Patent Application Publication 2005-29870 and so on, for example. Accordingly, advancing the use of high-strength bolts having a strength of 14T (minimum tensile strength 1400 N/mm$^2$, hardness 44 to 47 HRC), which is the maximum strength that can be put to practical use at present, in place of conventional bolts to achieve dramatic size reductions in comparison with conventional bolts has become an unavoidable problem in terms of fuel efficiency, environmental friendliness, and so on. Accordingly, in recent years, the development of bolts having maximum strength has become a technological problem requiring urgent attention.

However, to achieve a strength increase and a size reduction in a bolt, the size of the nut member must be reduced in accordance therewith, and therefore the size of a thread ridge in the internal screw hole of the nut member must also be reduced in size. If the bolt alone is increased in strength, a load on a thread ridge fitting portion of the nut member increases, leading to a large offset load on a root portion of a first fitting thread of the nut member, which may lead to a fatigue fracture in a corresponding location. In addition to fatigue fractures, the nut member may be unable to withstand a tightening force of 14T, which is applied during static tightening performed to achieve tightening, and as a result, the internal screw part may break. Therefore, the fitting portion of the thread ridge to which the nut member is screwed must be lengthened (in the case of an aluminum internal screw, between 2.5 and 3 times the screw diameter, and in the case of a steel internal screw, no less than 2.2 times the screw diameter) to reduce the load value per thread. In such a case, large-scale design modification must be performed on the periphery of the screw hole of the partner member doubling as the internal screw member in order to increase the hole depth, and since the fitting length (fitting portion) becomes longer than a conventional fitting length as a result, a retrograde step is made in terms of reducing the size of the bolt.

Furthermore, attempts have been made in the related art to improve fatigue strength by rolling the bolt following heat treatment to provide the root portion with residual stress, thereby improving the fatigue strength. For example, it is said that an engine bolt can withstand use when the fatigue strength thereof at the number of stress cycles of 5×10$^6$ is approximately 50 MPa, and therefore the actual fatigue strength of the engine bolt must possess at least this characteristic. A fatigue strength of 50 MPa is the average ability level of a product obtained through heat treatment after rolling. However, these elements vary according to relative pitch errors with the combined nut, the spring constant of a bolt/nut fastener, and tightening axial tension variation, and therefore rolling after heat treatment is performed to obtain a greater increase in the fatigue limit. However, when rolling after heat treatment is performed on a high-strength bolt having a strength of 14T (minimum tensile strength 1400 N/mm$^2$, hardness 44 to 47 HRC), a rolling tool is subjected to severe wear, and as a result, the life of the tool decreases to 1/10 of a tool used in heat treatment after rolling. It is therefore impractical in terms of productivity and cost to improve the fatigue strength of a bolt having a strength of 14T by performing rolling after heat treatment. Japanese Unexamined Patent Application Publication 2007-321858 discloses another method of improving fatigue strength in which a pitch error between a bolt and a nut is used to reduce the degree of unevenness in the distribution of stress on a fitting screw root portion. However, the value of the pitch error used in this method must be managed in μm units, and therefore this method is likewise impractical in terms of productivity and cost. Hence, at present, no effective solutions exist for increasing the fatigue limit.

SUMMARY OF THE INVENTION

In consideration of the points described above, an object of the present invention is to provide a tightening structure with which a reduction in processing steps is achieved without modifying the shape of a partner member (nut member), the strength of a bolt is increased, and fatigue fractures are avoided, and with which the fitting length of a thread ridge is not altered greatly in comparison with a conventional tightening structure such that a size reduction can be achieved safely and effectively, thereby contributing greatly to a reduction in the weight of a vehicle.

To achieve this object, in the present invention, a self-forming screw having a strength of 14T, which is manufactured by pre-heat treatment rolling and gradually self-forms an internal screw, is used as a tightening bolt, and a member having a prepared hole formed by casting alone or forging alone while not yet being subjected to screw formation, is used as a member into which the self-forming screw is screwed.

As a result, there is no need to modify the shape of the partner member into which the self-forming screw is screwed, and therefore a reduction in the number of processing steps of the partner member can be achieved. Moreover, no clearance is generated on a contact surface between an external (male) screw and an internal (female) screw by the self-forming screw having a strength of 14T, which gradually self-forms the internal screw, and stress on a first engagement screw root portion of the nut member, in which stress is most concentrated, can be reduced through dispersion while strengthening the tightening. As a result, improvements in the strength of the bolt and the fatigue strength of the tightening thread ridge can be realized, and since the fitting length of the thread ridge is not altered greatly in comparison with a conventional tightening structure, a size reduction can be achieved effectively, thereby contributing greatly to a reduction in the weight of a vehicle.

BRIEF DESCRIPTION OF THE DRAWINGS

FIG. 1 shows a self-forming screw used in the present invention;

FIG. 4 is a view showing measurement results of stress values in a root portion of each fitting thread ridge, and summarizing these measurement results;

FIG. 5 is a view of an embodiment showing a thread-forming characteristic and a tightening characteristic, implemented to determine a best use application range of a high-strength self-forming screw;

FIG. 6 is a view of another embodiment showing a thread-forming characteristic and a tightening characteristic, implemented to determine the best use application range of the high-strength self-forming screw.

DESCRIPTION OF THE PREFERRED EMBODIMENTS

Figure 2:
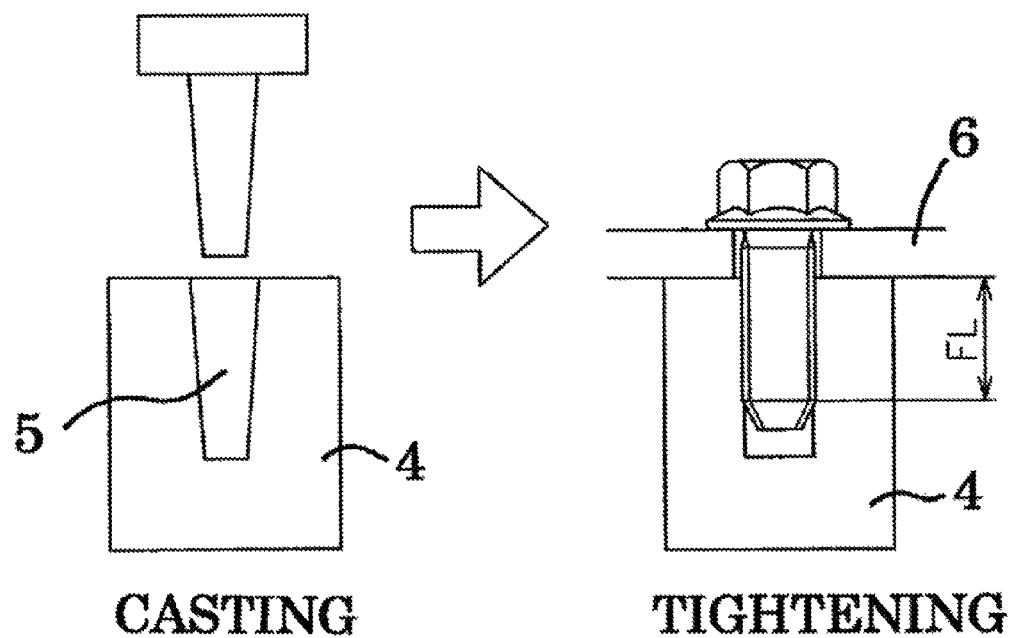
FIG. 2 shows a cast member used in the present invention.

Preferred embodiments of the present invention will become evident from the following description with reference to the attached drawings.

F1G. 1 shows a self-forming screw 1 used in the present invention. The self-forming screw 1 is a steel screw manufactured by pre-heat treatment rolling and having a strength of 14T (minimum tensile strength 1400 N/mm$^2$, hardness 44 to 47 HRC). A thread portion thereof is constituted by a tapered self-forming thread portion 3 and a parallel thread portion 2 for performing normal tightening. The self-forming thread portion 3 is formed over a range of 1 to 5 pitches, and a maximum outer diameter or hypothetical outer diameter thereof d1 is between 1 and 10% larger than the outer diameter d of an external screw of the parallel thread portion 2. The hypothetical outer diameter denotes the diameter of a column formed hypothetically by the tip ends of projections when projections are provided on the thread portion of the self-forming thread portion 3, for example. Further, when the screw and shaft of the self-forming thread portion 3 are triangular (a triangular block), the hypothetical outer diameter denotes the diameter of a column formed hypothetically by the three apexes of the triangle. By making the maximum outer diameter or hypothetical outer diameter of the self-forming portion 1 to 10% larger than the outer diameter of the external screw of the parallel thread portion 2 in this manner, screwing of the parallel thread portion is assisted, and a "percentage of thread engagement" of the screw, to be described below, is defined. When the maximum outer diameter (or hypothetical outer diameter) is no more than 10% larger than the outer diameter of the external screw of the parallel thread portion 2, the parallel portion is fitted without clearance due to spring-back following self-forming plastic deformation. However, when the maximum outer diameter (or hypothetical outer diameter) exceeds 10%, the allowable spring-back range is exceeded, generating clearance, and as a result, stress on a first engagement root portion, in which stress is most concentrated, cannot be reduced effectively. Further, the thread portion is coated with a friction stabilizer (friction reducing agent) to reduce driving torque and stabilize a torque coefficient, thereby suppressing variation in an axial tension generated during tightening and a coefficient of friction.

FIG. 2 shows a cast member 4 having low material strength, for example an aluminum die-cast member, which is used in the present invention. A prepared hole 5 (the taper shown in the drawing is emphasized) formed by casting is provided in the cast member 4 as a nut member for the self-forming screw 1. The self-forming screw 1 is screwed directly into the prepared hole 5 provided in the cast member 4, and while the self-forming screw 1 self-forms an internal screw, an attachment member 6 is fastened to the cast member 4. Alternatively, a plurality of attachment members (not shown) is fastened by the self-forming screw 1 and the cast member 4. By making a bolt into a self-forming bolt in this manner, prepared hole drilling, tapping for forming an internal screw, and associated washing processes do not need to be performed on the prepared hole 5, and therefore a reduction in the number of processing steps and a reduction in cost can be achieved.

When the fastened self-forming screw 1 and the cast member 4 are fastened through self-forming, no clearance is generated on a contact surface between the external screw and internal screw, and therefore the strength of the tightening increases such that stress on the first engagement root portion, in which stress is most concentrated, is reduced through dispersion, as shown in FIG. 4. As a result, the maximum principal stress applied to the root portion of a first fitting thread of the cast member 4 can be reduced from 756 MPa (in the case of a cut internal screw) to 597 MPa, as is evident from FIG. 4, which is a reduction of approximately 21% in the maximum principal stress. Hence, the internal screw part can withstand a tightening force of 14T during the tightening process, and fractures do not occur in the internal screw part. Moreover, a large increase of approximately 17% can be achieved in the fatigue strength of the internal screw and external screw. Further, in comparison with a conventional method in which a pitch error is applied to a bolt and a nut (a cut internal screw), the maximum principal stress applied to the root portion of the fitting thread is greatly reduced, leading to a clear reduction in the average stress value, as is evident from the graph in FIG. 4. Hence, when the cast member 4 is a member having low material strength, for example an aluminum die-cast member, the fitting length of the screw and the prepared hole and the fitting portion of the screwed thread need not be lengthened, and a fitting length FL of approximately d to 2.5d (d being the screw diameter) is sufficient. Since this fitting length does not differ greatly from that of a conventional tightening structure, there is no need for large-scale design modifications to the cast member 4, and therefore cost increases are avoided.

Figure 3:
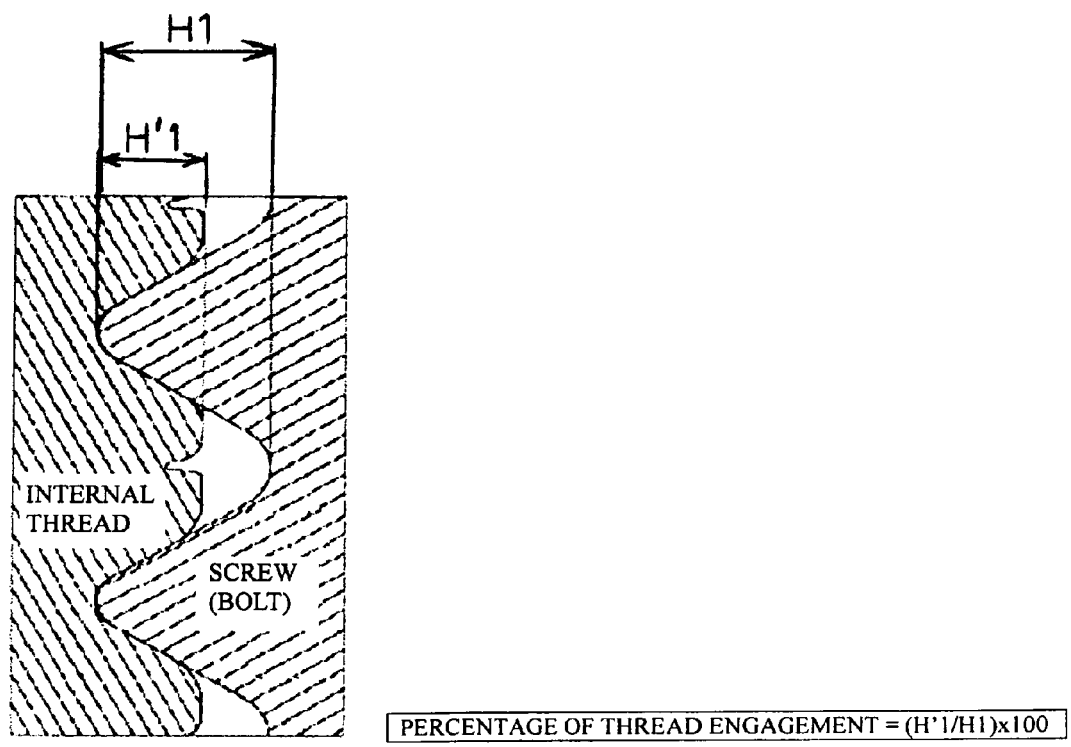
FIG. 3 is a view illustrating a "percentage of thread engagement" of the self-forming screw.
Figure 7:
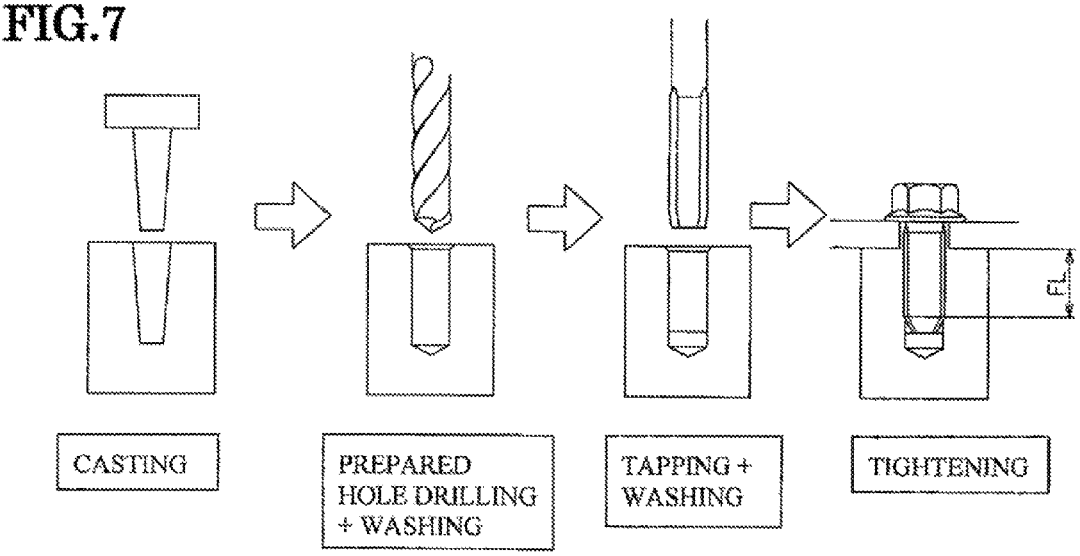
FIG. 7 shows a sequence of processing steps implemented on a conventional cast member.

FIG. 3 is a view illustrating a percentage of thread engagement between an internal screw formed by self-forming and an external screw. Here, if a "thread overlap" (an actual contact height) between the external screw and internal screw when screwed together is set at H1' and a basic height of thread of an external screw (bolt) having a basic thread ridge is set as a "basic thread overlap" H1, the "percentage of thread engagement" of the screw is defined as the percentage of H1' relative to H1, or in other words (H1'/H1)×100%. By setting the percentage of thread engagement between an internal screw formed by self-forming and an external screw at 75 to 90%, as in the present invention, the combination of the prepared hole diameter and the thread portion dimension is optimized. As a result, a superior thread-forming characteristic and a superior tightening characteristic are obtained in comparison with conventional tightening, and these characteristics are stabilized. When the "percentage of thread engagement" is greater than 90%, driving torque becomes too great, leading to deterioration of the screwing operability, and the driving torque greatly affects the precision of the casting ejected prepared hole. Further, when the "percentage of thread engagement" is smaller than 75%, the stability of the generated axial tension is impaired, and as a result, variation may occur in the tightening characteristic such that it becomes impossible to obtain sufficient tightening force. Furthermore, axial tension variation during tightening has a large adverse effect on the fatigue strength, and is a fatal flaw in a tightening site that requires a leak capacity.

The above description is summarized in FIG. 5. The table in FIG. 5 shows the results of tests relating to the driving torque, the torque coefficient, variation in the generated axial tension, the strength of the internal screw, and the fatigue strength, which are related to the tightening characteristic and operability, these tests having been performed under various conditions relating to the outer diameter of the self-forming portion, the percentage of thread engagement, the fitting length, and the presence of a friction stabilizer. An aluminum die-cast material (ADC12) currently used for bolts was employed as the material for forming the internal screw. To measure the driving torque of (a) in the table shown in FIG. 5, a test was performed to determine whether or not the driving torque decreases below a maximum driving torque value relative to strength classifications 05, 10 and 12, defined in Table 8 of JISB1056, at the capacity of a prevailing torque type steel hexagonal nut defined in JISB1056. The coefficient of friction of (b) was measured using a tightening test method for a screw component defined by JISB1084. A reference value of the tested coefficient of friction was set at 0.180, which is the coefficient of friction of a current bolt employing a cut internal screw. The generated axial tension variation of (c) was measured using the tightening test method for a screw component defined by JISB1084. The reference of the test was whether or not the axial tension variation decreased below axial tension variation at a set,torque value of a current bolt (strength classification 10.9, number of thread ridges n=10) employing a cut internal screw. With respect to the internal screw strength of (d), a tensile load was applied in a bolt axis direction with the bolt in a fitted state, and the maximum breaking load of the internal screw was measured. A breaking load of no less than 1.5 times a bolt tensile load minimum value (M10×P1.5: 81.2 kN) of a strength classification 14.9 (stress value 1400 MPa) was used as a reference. This numerical value of 81.2 kN is obtained by multiplying the tensile load (stress value) 1400 N/mm$^2$ of the strength classification 14.9 by an effective sectional area 58.0 mm$^2$ of M10×P (pitch) 1.5. The fatigue strength of (e) was tested by an "axial load fatigue testing method and result evaluation" for a screw component, defined in JISB1081. When the average load is 40% of a 0.2% proof stress and the number of stress cycles is 5×10$^6$, a target fatigue limit was 50 MPa. As is evident from the results in the table shown in FIG. 5, components having a superior "overall evaluation" to a current component are indicated by a double circle and are exclusive to the present invention. In this table, test results relating to components having a fitting length of over 2.5d are colored gray, but since components having a fitting length of over 2.5d are at variance to the object of the present invention, i.e. a reduction in fitting length, these components are merely provided as numerical values and evaluations for reference purposes.

FIG. 6 shows measurement results relating to the tests (a) to (e) described above in a case where the steel material used in a current bolt is employed as the material for forming the internal screw. When the member 4 is a steel member having a prepared hole 5 that has been subjected to casting alone or forging alone and is not screw-formed, the fitting length of the screw and the prepared hole can be maintained at approximately d to 2.2d (d being the screw diameter), without lengthening the fitting portion of the screwed thread ridge. Here also, the fitting length does not differ greatly from that of a conventional tightening structure, and hence there is no need for large-scale design modifications to the member 4. As a result, cost increases are avoided. It can be seen from the results in the table shown in FIG. 6 that components indicated by a double circle, i.e. having a superior "overall evaluation" to a current component, are exclusive to the present invention. In FIG. 6 also, test results relating to components having a fitting length of over 2.2d are tinted gray, but since components having a fitting length of over 2.2d are at variance to the object of the present invention, i.e. a reduction in fitting length, these components are merely provided as numerical values and evaluations for reference purposes.

Hence, by means of the fitting length (d to 2.2d or d to 2.5d) of the screw and prepared hole and the percentage of thread engagement (75 to 90%) between the internal screw formed through self-forming and the external screw, as defined by the present invention, the breaking limit load of the internal screw formed through self-forming proofs 1400 MPa, which is the tightening limit strength required of a 14T bolt as the tightening member, without the need to vary the material and strength of the member 4.

Embodiments and conventional examples of the present invention were described above on the basis of FIGS. 1 to 7, but the present invention is not limited to the above embodiments. The cast material is not limited to an aluminum die-cast material, and may be a normal casting material. Moreover, as described above, a forged member having a prepared hole formed through forging may be used instead of a cast member. In this case, a self-forming screw in which a tip end part serving as the self-forming thread portion has been hardened by induction hardening is used. Further, a vehicle is used as an example, but needless to say, the tightening structure of the present invention is not limited to a vehicle.

The tightening between the self-forming screw 1 and the member 4 according to the present invention elicits extremely favorable effects in that stress in a first engagement root portion, in which stress is most concentrated, can be reduced through dispersion without modifying the shape of the cast member or the forged member, and as a result, improvements in the strength and fatigue strength of the bolt can be realized. Moreover, the number of processing steps can be reduced by eliminating internal screw processing. As a result, the weight of a vehicle can be reduced, and tightening can be performed with greater tightening force.

What is claimed is:

1. A method of fastening at least one attachment member to a cast aluminum member with a self-forming screw, which comprises:

providing the cast member to which the attachment member is to be fastened with the self-forming screw, the cast member having a prepared hole for receipt of the self-forming screw and the prepared hole not being subjected to prior screw formation;

providing the self-forming screw, the self-forming screw including a shaft, a head at one end of the shaft, a tapered self-forming thread portion at an opposite end of the shaft, and a parallel thread portion disposed on the shaft intermediate the head and the tapered self-forming thread portion, wherein the self-forming screw is composed of steel having a strength of 14T which is created by pre-heat treatment rolling, the self-forming thread portion having a 1 to 5 pitch range and a maximum outside diameter or a maximum hypothetical outside diameter of 1 to 10 percent greater than the outer diameter of parallel thread portion, and wherein both the self-forming thread portion and the parallel thread portion are coated with a friction stabilizer;

providing the attachment member to be fastened;

threading the self-forming screw into the prepared hole of the cast member with the fastening member being positioned for fastening to the cast member, wherein a fitting length of the self-forming screw and the prepared hole is between d and 2.5 d where "d" is the diameter of the self-forming screw; and tightening the self-forming screw into in the prepared hole to form an internal screw thread with a first engagement root portion whereby a percentage of engagement between the internal screw thread and the self-forming screw is between 75 and 90 percent, wherein clearance is not generated on a contact surface between the self-forming screw and the internal screw thread during tightening thereby dispersing and reducing stress on the first engagement root portion of the internal screw thread.

2. The method of claim 1, wherein the tightened self-forming screw has a proof load of 1400 MPa.

3. A method of fastening at least one attachment member to a cast or forged steel member with a self-forming screw, which comprises:

providing the cast or forged steel member to which the attachment member is to be fastened with the self-forming screw, the cast or forged steel member having a prepared hole for receipt of the self-forming screw and the prepared hole not being subjected to prior screw formation;

providing the self-forming screw, the self-forming screw including a shaft, a head at one end of the shaft, a tapered self-forming thread portion at an opposite end of the shaft, and a parallel thread portion disposed on the shaft intermediate the head and the tapered self-forming thread portion, wherein the self-forming screw is composed of steel having a strength of 14T which is created by preheat treatment rolling, the self-forming thread portion having a 1 to 5 pitch range and a maximum outside diameter or a maximum hypothetical outside diameter of 1 to 10 percent greater than the outer diameter of parallel thread portion, and wherein both the self-forming thread portion and the parallel thread portion are coated with a friction stabilizer;

providing the attachment member to be fastened;

threading the self-forming screw into the prepared hole of the cast or forged steel member with the fastening member being positioned for fastening to the cast or forged steel member, wherein a fitting length of the self-forming screw and the prepared hole is between d and 2.2 d where "d" is the diameter of the self-forming screw; and tightening the self-forming screw into in the prepared hole to form an internal screw thread with a first engagement root portion whereby a percentage of engagement between the internal screw thread and the self-forming screw is between 75 and 90 percent, wherein clearance is not generated on a contact surface between the self-forming screw and the internal screw thread during tightening thereby dispersing and reducing stress on the first engagement root portion of the internal screw thread.

4. The method of claim 3, wherein the tightened self-forming screw has a proof load of 1400 MPa.

5. A tightening structure comprising:

a cast aluminum member and a surface to which at least one attachment member abuts and is fastened thereto with a tightened self-forming screw, the cast member having a prepared hole for receipt of the self-forming screw and the prepared hole not being subjected to prior screw formation;

wherein the self-forming screw includes a shaft, a head at one end of the shaft, a tapered self-forming thread portion at an opposite end of the shaft, and a parallel thread portion disposed on the shaft intermediate the head and the tapered self-forming thread portion, the self-forming screw being composed of steel having a strength of 14T which is created by pre-heat treatment rolling, the self-forming thread portion having a 1 to 5 pitch range and a maximum outside diameter or a maximum hypothetical outside diameter of 1 to 10 percent greater than the outer diameter of parallel thread portion, and wherein both the self-forming thread portion and the parallel thread portion are coated with a friction stabilizer;

wherein the tapered self-forming thread portion and the parallel thread portion of the self-forming screw are disposed in the prepared hole of the cast member with the fastening member being positioned intermediate the nut member and the self-forming screw, and wherein a fitting length of the self forming screw and the prepared hole is between d and 2.5 d where "d" is the diameter of the self-forming screw; and wherein the prepared hole includes an internal screw thread with a first engagement root portion that are formed by and engaged to the self-forming screw whereby a percentage of engagement between the internal screw thread and the self-forming screw is between 75 and 90 percent, and wherein no clearance exists on a contact surface between the self-forming screw and the internal screw thread thereby dispersing and reducing stress on the first engagement root portion of the internal screw thread.

6. The structure of claim 5, wherein the tightened self-forming screw has a proof load of 1400 MPa.

7. A tightening structure comprising:

a cast or forged steel member having a surface to which at least one attachment member abuts and is fastened thereto with a tightened self-forming screw, the cast or forged steel member having a prepared hole for receipt of the self-forming screw and the prepared hole not being subjected to prior screw formation;

wherein the self-forming screw includes a shaft, a head one end of the shaft, a tapered self-forming thread portion at an opposite end of the shaft, and a parallel thread portion disposed on the shaft intermediate the head and the tapered self-forming thread portion, the self-forming screw being composed of steel having a strength of 14T which is created by pre-heat treatment rolling, the self-forming thread portion having a 1 to 5 pitch range and a maximum outside diameter or a maximum hypothetical outside diameter of 1 to 10 percent greater than the outer diameter of parallel thread portion, and wherein both the self-forming thread portion and the parallel thread portion are coated with a friction stabilizer;

wherein the tapered self-forming thread portion and the parallel thread portion of the self-forming screw are disposed in the prepared hole of the cast or forged steel member with the fastening member being positioned intermediate the nut member and the self-forming screw, and wherein a fitting length of the self-forming screw and the prepared hole is between d and 2.2 d where "d" is the diameter of the self-forming screw; and wherein the prepared hole includes an internal screw thread with a first engagement root portion that are formed by and engaged to the self-forming screw whereby a percentage of engagement between the internal screw thread and the self-forming screw is between 75 and 90 percent, and wherein no clearance exists on a contact surface between the self-forming screw and the internal screw thread thereby dispersing and reducing stress on the first engagement root portion of the internal screw thread.

8. The structure of claim 7, wherein the tightened self-forming screw has a proof load of 1400 MPa.

* * * * *